US006975248B2

(12) United States Patent
Asari et al.

(10) Patent No.: US 6,975,248 B2
(45) Date of Patent: Dec. 13, 2005

(54) TRANSPORTATION MANAGEMENT SYSTEM

(75) Inventors: Shigeatsu Asari, Osaka (JP); Tetsuya Kaneshiro, Osaka (JP); Takaharu Hosoda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 477 days.

(21) Appl. No.: 10/397,853

(22) Filed: Mar. 27, 2003

(65) Prior Publication Data

US 2004/0002895 A1   Jan. 1, 2004

(30) Foreign Application Priority Data

Mar. 27, 2002   (JP) .......................... P2002-089146

(51) Int. Cl.⁷ ............................................ G08G 1/123
(52) U.S. Cl. ...................... 340/994; 340/433; 340/505; 340/573.1
(58) Field of Search ............................... 340/433, 505, 340/573.1, 994

(56) References Cited

U.S. PATENT DOCUMENTS 6,745,027 B2 * 6/2004 Twitchell, Jr. ........... 455/422.1
2002/0089434 A1 * 7/2002 Ghazarian .................. 340/988

* cited by examiner

*Primary Examiner*—Daniel Wu
*Assistant Examiner*—Samuel J. Walk
(74) *Attorney, Agent, or Firm*—McDermott Will & Emery LLP (57) ABSTRACT

A transportation management system comprises a management terminal device provided in a transportation medium and a management body device for remotely managing the transportation state of a transportation object. The management terminal device comprises a position detecting device, a get-on/off detecting device and a transportation information transmitter, which respectively, detects the current position of the transportation medium, detects the delivery-in/out of the transportation object to/from the transportation medium, and transmits transportation information to the management body device. The management body device comprises a transportation information receiver, a distance storage, a collator and a deciding device, which respectively, receives transportation information transmitted from the management terminal device, stores the transportation distance information of the transportation object, collates the transportation information with the transportation distance information, and decides the transportation state of the transportation object based on the collation result.

8 Claims, 6 Drawing Sheets

| Name | ID number | School attending get-on point | School attending get-on time | School leaving get-off point | School leaving get-off time |
|---|---|---|---|---|---|
| A | 0001 | α | 07:45 | α | 15:30 |
| B | 0002 | β | 07:50 | β | 15:35 |
| C | 0003 | γ | 07:55 | γ | 15:40 |

| Get on/off point | Place specifying information |
|---|---|
| α | $X_1$ degrees $X_2$ minutes $X_3$ seconds of north latitude : $Y_1$ degrees $Y_2$ minutes $Y_3$ seconds of east longitude |
| β | $X_4$ degrees $X_5$ minutes $X_6$ seconds of north latitude : $Y_4$ degrees $Y_5$ minutes $Y_6$ seconds of east longitude |
| γ | $X_7$ degrees $X_8$ minutes $X_9$ seconds of north latitude : $Y_7$ degrees $Y_8$ minutes $Y_9$ seconds of east longitude |

| Name | Contact address information |
|---|---|
| A | 123-4567 |
| B | 234-5678 |
| C | 345-6789 |

TRANSPORTATION MANAGEMENT SYSTEM

FIELD OF THE INVENTION

The present invention relates to a system for managing the transportation state of a transportation object in a transportation system for transporting the transportation object from a fixed point on a predetermined route to another fixed point by means of a transportation medium such as a vehicle to be periodically operated along the route.

BACKGROUND OF THE INVENTION

Conventionally, there has been a school bus pick-up system to be a system for picking up and sending off school and kindergarten children at the time of school attendance. The school bus pick-up system periodically operates a school bus when attending and leaving from school mornings and evenings along a predetermined route between a school and kindergarten and a school zone. School and kindergarten children are picked up and sent off by the operated school bus.

In the school bus pick-up system, it is possible to ensure the safety of the school and kindergarten children who get on the school bus. However, it is impossible to maintain the safety of the school and kindergarten children on a school zone route from a home to a school bus get-on point. For this reason, whether the school or kindergarten children are involved in an accident or trouble on the school zone route is to be decided in the following manner. More specifically, first of all, the crew of the school bus memorizes or registers the get-on point and time of each of the school and kindergarten children. The crew monitors whether the school and kindergarten children get on according to a schedule at get-on points and times which are memorized and registered. If a school or kindergarten child does not get on according to a schedule, it is decided that he (she) might be involved in an accident or trouble, which is reported to the school or kindergarten. The school or kindergarten contacts the family of the reported school or kindergarten child by telephone or other means to confirm the safety of the school or kindergarten child.

In the case in which get-on/off information is to be stored, however, the confirmation of the safety is carried out based on the memory and decision of the bus crew. For this reason, there is a possibility that a faulty memory or a wrong decision is made. Thus in such a case, high precision cannot be assured in the confirmation of the safety.

Moreover, in the case in which the get-on/off information is to be registered, the safety can only be confirmed based on collating with the registered contents. Accordingly, a great deal of time and labor are required for the safety conformation.

SUMMARY OF THE INVENTION

It is a main object of the present invention to provide a system capable of deciding the situation of transportation of a transportation object with high precision and rapidly reporting the same situation during transportation.

In order to attain the object, the present invention provides a transportation system for transporting a transportation object from a fixed point on a predetermined route to another fixed point by means of a transportation medium to be periodically operated along the route, in which a system for managing the transportation state of the transportation object is constituted as follows.

More specifically, the system comprises a management terminal device provided in the transportation medium, and a management body device for remotely managing the transportation state of the transportation object. The management terminal device comprises a position detecting device for detecting a current position of the transportation medium, a get-on/off detecting device for detecting delivery in/out of the transportation object to/from the transportation medium, and a transportation information transmitter for transmitting transportation information including current position information of the transportation medium and delivery-in/out information of the transportation object to the management body device. The management body device comprises a transportation information receiver for receiving transportation information transmitted from the management terminal device, a distance storage for storing predetermined transportation distance information for each transportation object, a collator for collating the received transportation information with the transportation distance information, and a deciding device for deciding the transportation state of the transportation object based on the collation result by the collator.

According to this system, the deciding device can accurately decide whether or not the transportation object is transported in accordance with a preset transportation distance based on the result of the collation of the collator.

It is preferable that the management terminal device should further have a recognizing device for individually recognizing the transportation object and the get-on/off detecting device should serve to individually recognize the transportation object and to detect delivery-in/out. Consequently, the transportation object can be recognized individually. Thus, the decision of the transportation state can be carried out with higher precision.

It is preferable that the management body device should further have a first decision result transmitter for transmitting, to the management terminal device, decision result information obtained by the deciding device and the management terminal device should further have a decision result receiver for receiving the decision result information, and an alarm for reporting the decision result information thus received. Consequently, the crew of the transportation medium can acknowledge the transportation state of the transportation object by the alarming action of the alarm.

It is preferable that the management body device should further have a contact address information storage for storing contact address information of a communicating device carried by a person who manages transportation of the transportation object (hereinafter, manager), and a second decision result transmitter for reading, from the contact address information storage, the contact address information of the communicating device carried by the transportation manager of the transportation object having the decision result obtained from the deciding device and for transmitting the decision result information to the communicating device based on the contact address information thus read. Consequently, the transportation manager can acknowledge the transportation state of the transportation object based on the decision result information transmitted from the second decision result transmitter.

In many cases, necessary information for the transportation manager is a defective transportation, while information of normally operated transportation is not particularly required. For this reason, it is preferable that the second transportation result transmitter should serve to transmit a decision result to the transportation manager when the deciding device decides that the transportation is defective.

It is preferable that the transportation object should be a person, a passage recognizing device for recognizing presence of passage of the transportation object and transmitting recognition result information to the management body device is provided on a passageway connecting a residence of the transportation object and a fixed point on the route. Furthermore, it is preferable that the management body device should further have a recognition result information receiver for receiving the recognition result information, and the deciding device should decide a transportation state of the transportation object based on the recognition result information thus received and a collation result of the collator. Consequently, it is possible to execute the acknowledgement management of the safety of the transportation object on the passageway connecting the residence area of the transportation object and the fixed point on the route.

It is preferable that the passage recognizing device should decide a direction of movement when the transportation object passes through the passage recognizing device. Consequently, it is possible to grasp the direction of movement of the transportation object on the passageway and to further enhance precision in the acknowledgement of the safety of the transportation object on the passageway.

It is preferable that the management body device should further have a transportation state output device for outputting transportation state information of the transportation object according to a request sent from an external communication terminal device. Consequently, the management body device can exhibit the function of certifying the transportation state of the transportation object externally.

BRIEF DESCRIPTION OF THE DRAWINGS

Other objects of the present invention will be apparent from understanding of an embodiment which will be described below and will be clarified in appended claims. Various advantages which are not mentioned in this specification will be apparent to the skilled in the art by the execution of the present invention:

DETAILED DESCRIPTION OF THE INVNETION

Figure 1:
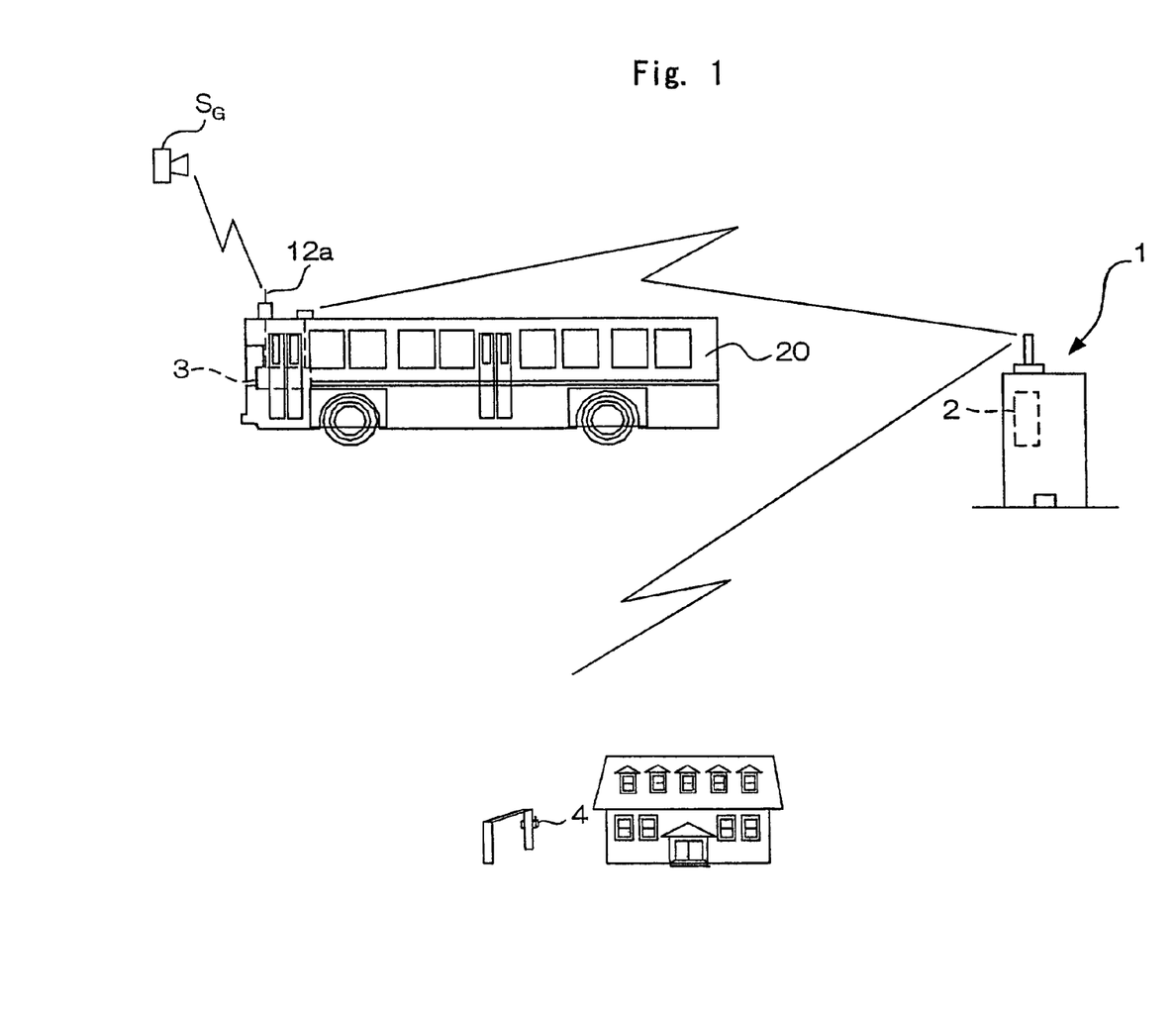
FIG. 1 is a view showing the whole structure of a transportation management system according to a preferred embodiment of the present invention.
Figure 2:
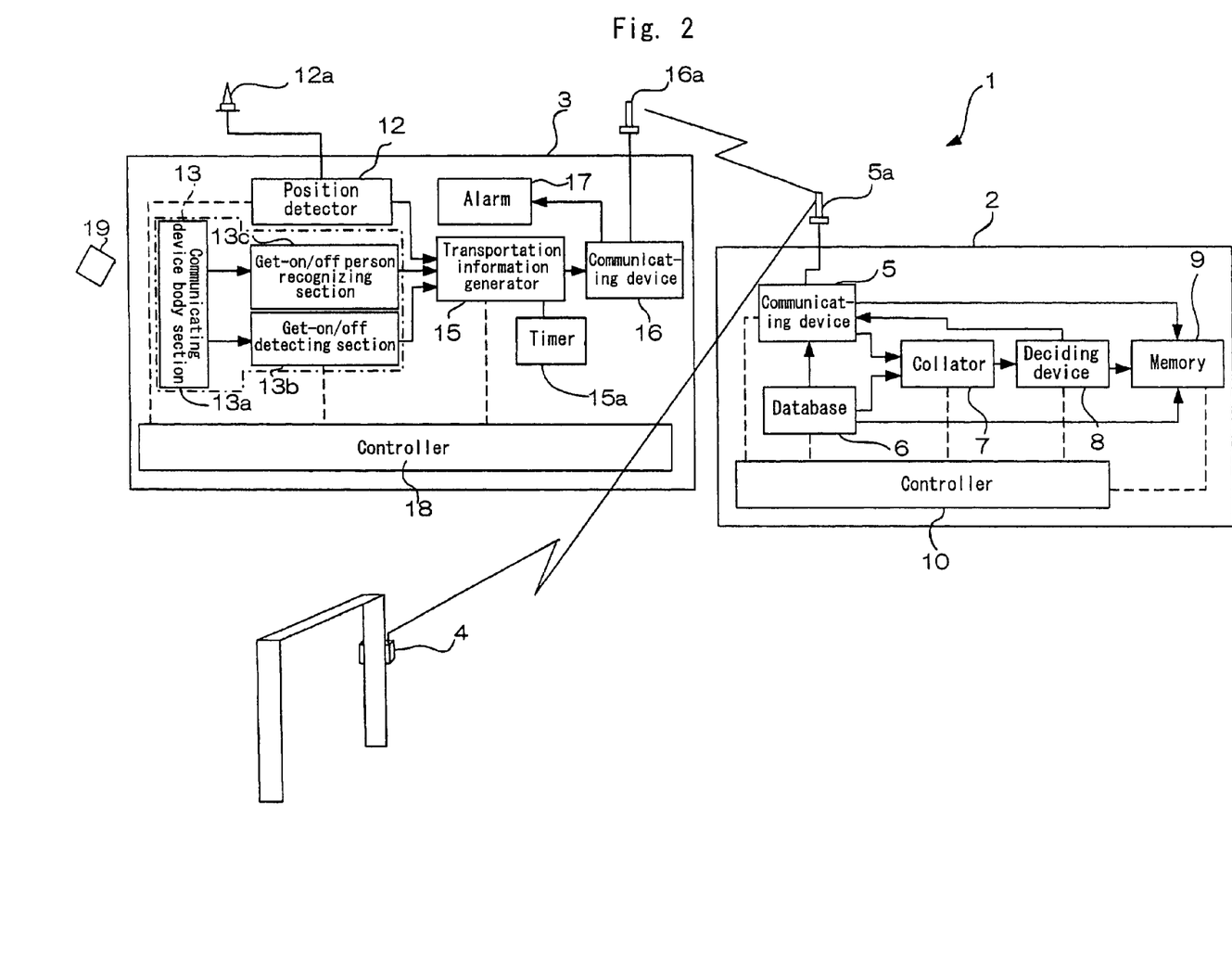
FIG. 2 is a block diagram showing the structure of the transportation management system according to the embodiment.

A preferred embodiment of the present invention will be described below with reference to the drawings. FIG. 1 is a schematic view showing a transportation management system according to the preferred embodiment of the present invention. FIG. 2 is a diagram showing the structure of each device constituting the transportation management system.

A transportation management system 1 serves to manage the transportation (pick-up and send-off) management in a school bus pick-up system for picking up and sending off school and kindergarten children at the time of school attendance. The transportation management system 1 comprises a management body device 2, a management terminal device 3 and a passage recognizing device 4.

The management body device 2 serves to intensively manage the pick-up state of the school and kindergarten children. The management body device 2 is provided in the building of an organization having a pick-up management business transferred from a school and a kindergarten or the like. In the case in which the school and the kindergarten directly do the pick-up management business, the management body device 2 is provided in the building of the school or kindergarten or the like.

The management body device 2 comprises a communicating device 5, a database 6, a collator 7, a deciding device 8, a memory 9 and a controller 10.

The communicating device 5 sends and receives various signals through a wired circuit network (including an internet communication network) or a radio circuit network (including a cell phone circuit network) between the management terminal device 3 and the passage recognizing device 4.

The database 6 stores identification information (an ID number in the embodiment) about school and kindergarten children to be a transportation (pick-up and send-off) object and a pick-up schedule. These information are stored as interrelated recording tables. More specifically, the database 6 comprises a pick-up registration table 11A, a get-on/off point registration table 11B and a contact address registration table 11C. In the following description, the school and kindergarten children are assumed to be three A, B and C to explain in a simplified manner. However, the present invention can be executed in the same manner with more or less than three.

Figure 3:
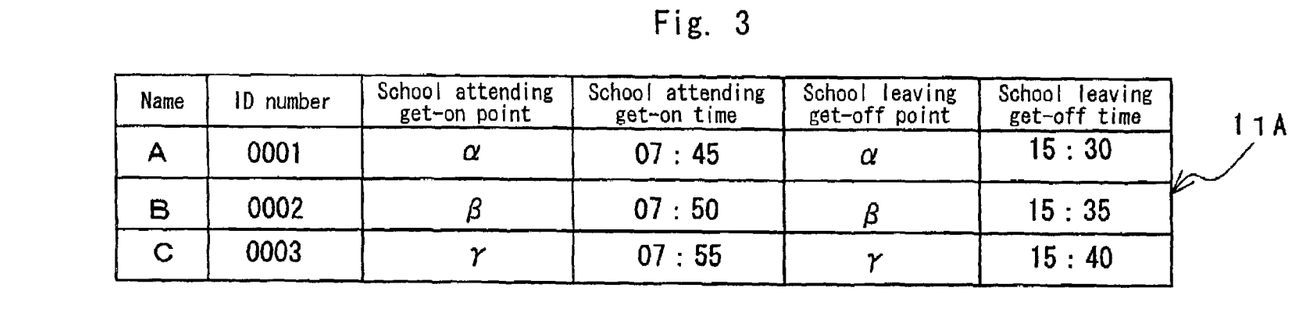
FIG. 3 is an example of a pick-up registration table in the transportation management system according to the embodiment.
Figure 4:
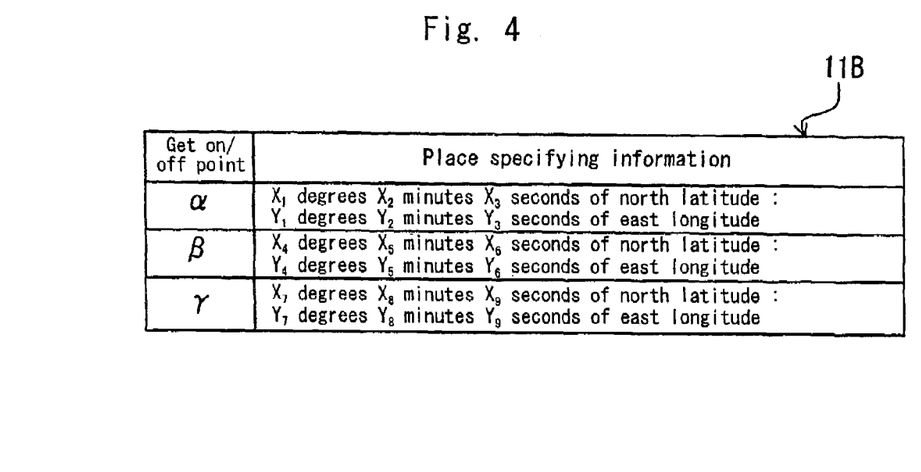
FIG. 4 is an example of a get-on/off point registration table in the transportation management system according to the embodiment.
Figure 5:
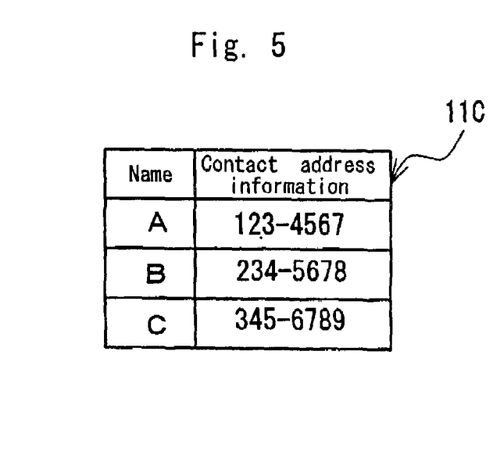
FIG. 5 is an example of a contact address registration table in the transportation management system according to the embodiment.

As shown in FIG. 3, the pick-up registration table 11A is a database represented as a table in which a name, an ID number, a school attending get-on point, a school attending get-on time, a school leaving get-off point (which is usually the same as the school attending get-on point) and a school leaving get-off time are arranged to correspond with respect to each other. As shown in FIG. 4, the get-on/off point registration table 11B is a database represented as a table in which the name of each get-on/off point and position specifying information thereof (herein, latitude and longitude information as an example) are arranged to correspond with respect to each other. As shown in FIG. 5, the contact address registration table 11C is a database represented as a table in which the name of each of the school and kindergarten children A, B and C and contact address information of a communicating device carried by a guardian are arranged to correspond with respect to each other. While telephone number information is set to be the contact address information in the embodiment, the contact address information may be mail address information for e-mail communication used on a personal computer or a cell phone.

When the management body device 2 is provided in a pick-up management company, not in the school or the kindergarten, the contact address information of the school and kindergarten are also registered in the contact address registration table 11C.

The collator 7 collates the pick-up information about the school and kindergarten children A, B and C which are input from the management terminal device 3 or the passage recognizing device 4 through the communicating device 5 with the contents registered in the database 6 to output a result of the decision to the deciding device 8. The deciding device 8 offers a comprehensive decision on the pick-up state of each of the school and kindergarten children A, B and C based on the result of the collation which is input from the collator 7. The memory 9 stores the result of the decision obtained by the deciding device 8 and the like. The controller 10 controls the operation of the entire management terminal device 2.

The management terminal device 3 is provided in a vehicle (hereinafter referred to as a school bus) 20 for transporting (picking up and sending off) the school and kindergarten children A, B and C.

The management terminal device 3 comprises a position detector 12, a contact/non-contact communicating device 13, a transportation information generator 15, a communicating device 16, an alarm 17 and a controller 18.

The position detector 12 uses a GPS (Global Positioning System). Since a conventional GPS can be employed, the detailed description of the GPS is omitted.

The contact/non-contact communicating device 13 serves to carry out a contact/non-contact communication together with a non-contact communication card (hereinafter referred to as an ID card) 19 carried by each of the school and kindergarten children A, B and C. The contact/non-contact communicating device 13 comprises a communicating device body 13a, a get-on/off detecting section 13b and a get-on/off person recognizing section 13c. The communicating device body 13 executes the contact/non-contact communication described above. The get-on/off person detecting section 13b serves to detect the ID card 19, thereby detecting that the school and kindergarten children A, B and C carrying the ID card 19 get on/off the school bus 20. The get-on/off person recognizing section 13c individually recognizes, through the contact/non-contact communication with the ID card 19, the school and kindergarten children A, B and C carrying the ID card 19 who get on/off the school bus 20. The respective ID numbers set for the school and kindergarten children A, B and C are prestored in the ID card 19 in such a manner that the individual recognition can be carried out. The get-on/off recognizing section 13c reads the ID number of the ID card 19 and recognizes a getting on/off person (each of the school and kindergarten children A, B and C).

For the ID card 19 to be used for the contact/non-contact communication, an existing card such as a magnetic card or an IC card can be used. For the structure of the contact/non-contact communication using the ID card 19, an existing skill can be employed. Therefore, the description of the detailed structures of the ID card 19 and the contact/non-contact communication is omitted.

The transportation information generator 15 comprises a timer 15a and generates transportation information obtained by superposing the output of the position detector 12, that of the get-on/off person recognizing section 13c, that of the get-on/off detecting section 13b and the time information of the timer 15a. The communicating device 16 receives and sends various signals together with the communicating device 15 of the management body device 2.

The communicating device 16 sends and receives various signals through a wired circuit network (including an internet communication network) or a radio circuit network (including a cell phone circuit network) together with the management body device 2.

The alarm 17 is constituted by a display device, a vocal device or the like, and displays or vocally processes information from the management body device 2 which is received through the communicating device 16, thereby reporting the information to the crew of the school bus 20.

The reference numeral 12a denotes a GPS antenna for receiving a radio wave generated from a GPS satellite $S_G$ and supplying the same radio wave to the position detector 12. The reference numerals 5a and 16a denote communication antennas provided in the communicating devices 5 and 16.

The passage recognizing device 4 is provided on a route connecting a residence (home) of each of the school and kindergarten children A, B and C and the get-on/off point of the school bus 20. The passage recognizing device 4 serves to detect and individually recognize the school and kindergarten children A, B and C passing through the passage recognizing device 4. The passage recognizing device 4 executes the contact/non-contact communication together with the IC card 19 carried by each of the school and kindergarten children A, B and C, thereby detecting and individually recognizing the school and kindergarten children A, B and C. The passage recognizing device 4 is constituted as a device having the function of the get-on/off detecting section 13b and that of the get-on/off person recognizing section 13c. The passage recognizing device 4 sends, to the management body device 2, the passage information signals of the school and kindergarten children A, B and C which are recognized.

In order to recognize the school and kindergarten children A, B and C immediately after going to school from home or immediately before coming home, it is preferable that the passage recognizing device 4 should be provided in a position which is just close to the residence of each of the school and kindergarten children A, B and C.

In the embodiment, each element according to claims is constituted by the following sections. More specifically, a position detecting device is constituted by the position detector 12 and the controller 18. A get-on/off detecting device is constituted by the get-on/off detector 13 and the controller 18. A transportation information transmitter is constituted by the transportation information generator 15, the communicating device 16 and the controller 18. A transportation information receiver is constituted by the communicating device 5 and the controller 10. A distance storage is constituted by the database 6 (the pick-up registration table 10A and the get-on/off point registration table 10B) and the controller 10. A collating device is constituted by the collator 7 and the controller 10. A deciding device is constituted by the deciding device 8 and the controller 10. A recognizing device is constituted by the get-on/off person recognizing section 13c and the controller 18. A first decision result transmitter is constituted by the communicating device 5 and the controller 10. A decision result receiver is constituted by the communicating device 16 and the controller 18. An alarm device is constituted by the alarm 17 and the controller 18. A contact address information storage is constituted by the database 6 (the contact address registration table 10C) and the controller 10. A second decision result transmitter is constituted by the communicating device 5 and the controller 10. A recognition result information receiver is constituted by the communicating device 5 and the controller 10.

However, these structures are simply based on an embodiment for carrying out the present invention. In the present invention, it is apparent that any structure having the same functions as those of these structures should be employed.

Figure 7:
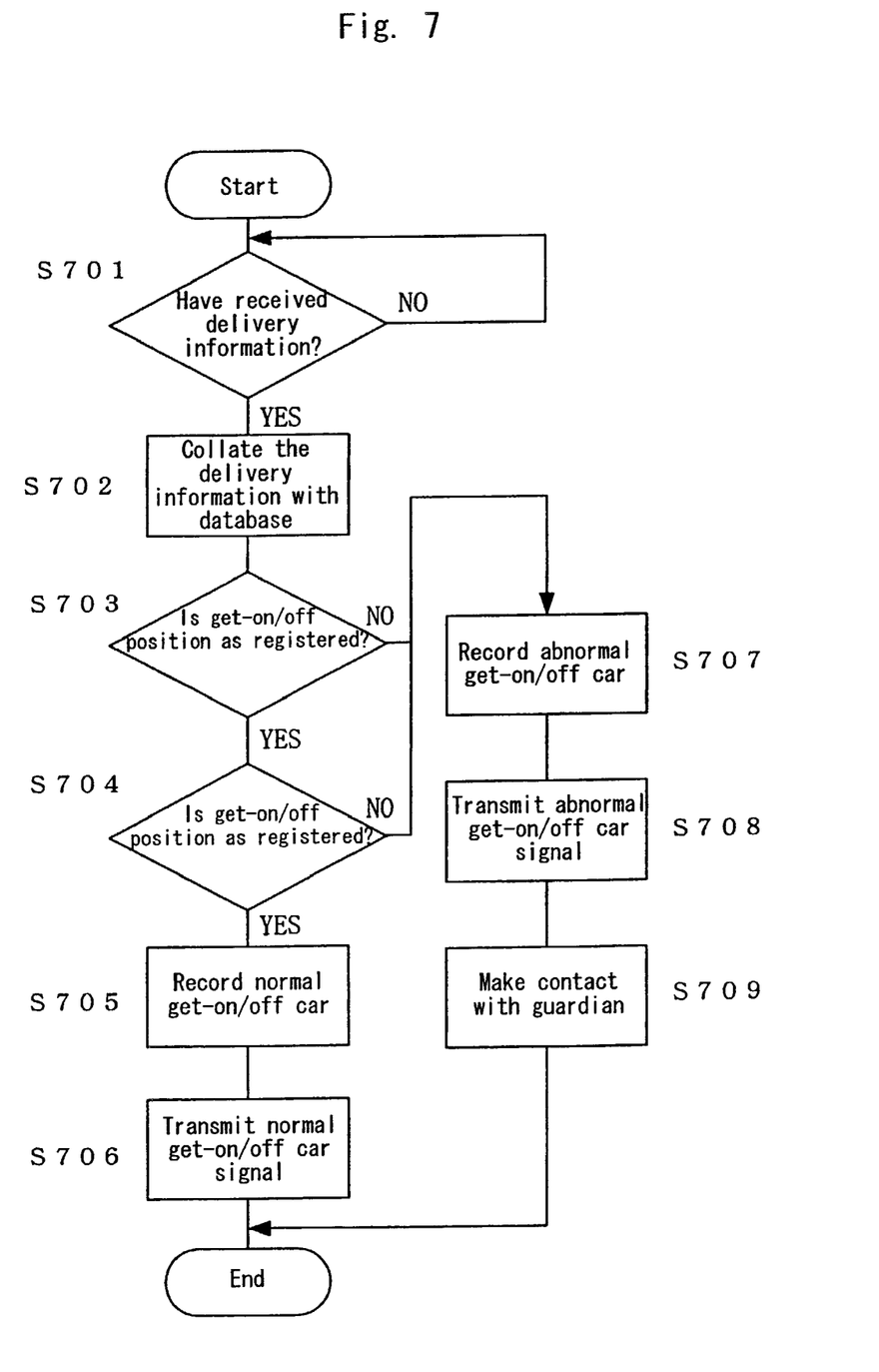
FIG. 7 is a flowchart for explaining the operation of the transportation management system according to the embodiment.
Figure 8:
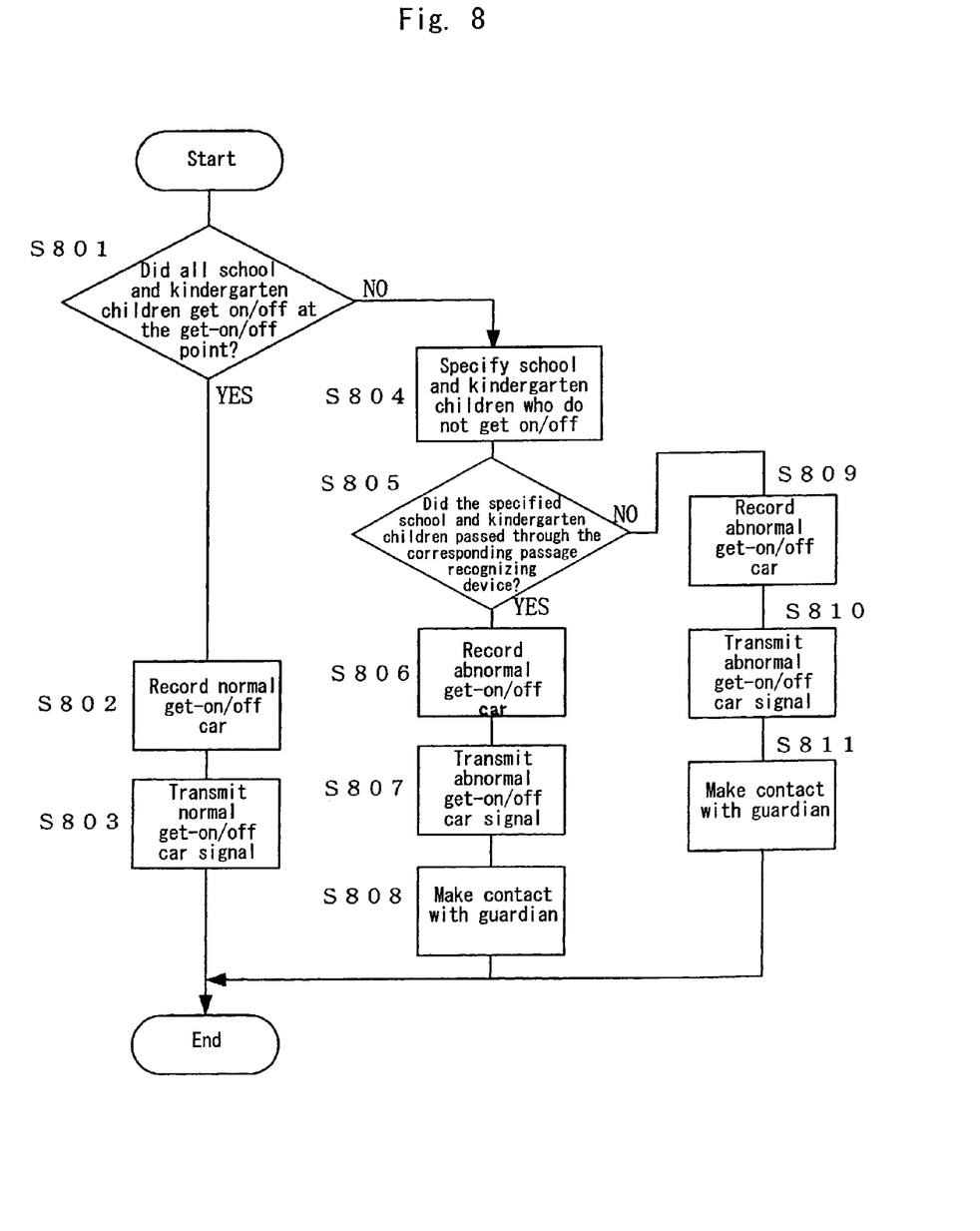
FIG. 8 is a flowchart for explaining the operation of the transportation management system according to the embodiment.

The operation of the transportation management system 1 will be described with reference to a view for explaining a transportation state in FIG. 6 and flowcharts in FIGS. 7 and 8. FIGS. 7 and 8 are flowcharts showing the operation of the management body device 2.

Figure 6:
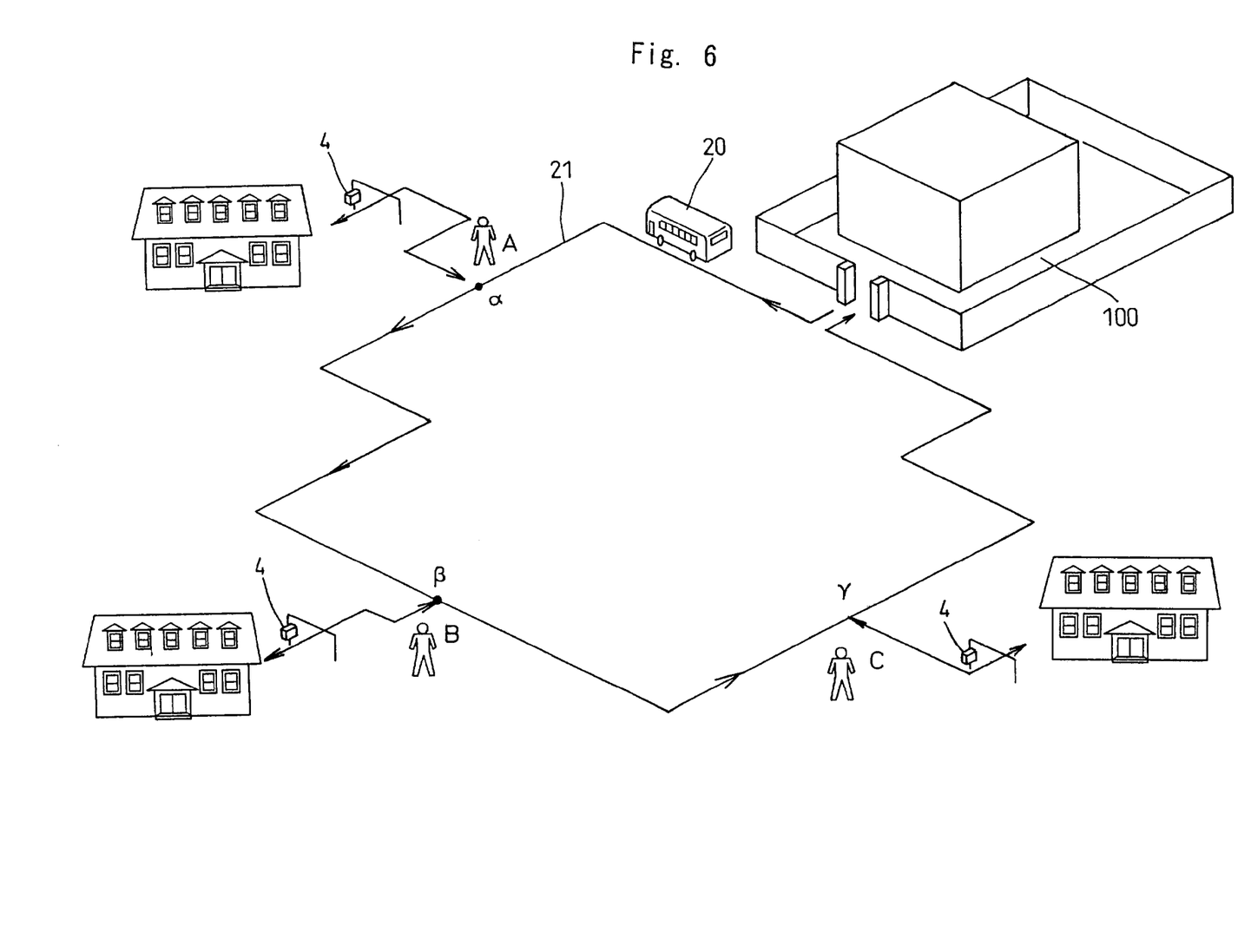
FIG. 6 is a view showing an example of the transportation configuration of a transportation system for executing the transportation management system according to the embodiment.

Description will be given by taking, as an example, a school bus operating system for operating the school bus 20 along a cyclic route 21 set between a school or kindergarten 100 and a school attendance range to cause the school or kindergarten children A, B and C to attend and leave the school as shown in FIG. 6. In the school bus operating system, get-on/off points α, β and γ are sequentially set onto the operation route 21. Position specifying information about these get-on/off points α, β and γ are stored in the get-on/off point registration table 11B shown in FIG. 4. In the present embodiment, each of the get-on/off points α, β and γ is registered in the following manner. At the get-on/off point α, it is registered that the school or kindergarten child A gets on and off. At the get-on/off point β, it is registered that the school or kindergarten child B gets on and off. At the get-on/off point γ, it is registered that the school or kindergarten child C gets on and off. These get-on/off information are stored in the pick-up registration table 11A shown in FIG. 3 in a correspondence state to respective get-on/off times.

In the following description, for simplicity, the operation of the transportation management system 1 will be explained on the assumption that a hindrance to the operation of the school bus 20, for example, a traffic jam is not caused.

First of all, the individual ID card 19 is previously distributed to the school or kindergarten children A, B and C. Personal information stored in the ID card 19 is previously stored in the database 6 corresponding to each person.

The school or kindergarten children A, B and C carry the ID card 19 thus distributed and attend and leave school. At the time of school attendance and leaving, when passing through the passage recognizing device 4 provided on their respective school zone routes, the school or kindergarten children A, B and C execute a contact/non-contact communication between the carried ID card 19 and the passage recognizing device 4. Consequently, the passage recognizing device 4 recognizes that the school or kindergarten children A, B and C pass through their school zone routes. When completing the recognition of the passage, the passage recognizing device 4 generates a passage information signal obtained by combining the ID numbers of the school or kindergarten children A, B and C and the completion of the passage. Then, the passage recognizing device 4 transmits the passage information signal thus generated to the management body device 2. If the passage recognizing device 4 to be provided has the function of detecting the direction of the passage of the school or kindergarten children A, B and C, it can detect the direction of the passage (the direction of school attendance or school leaving), and furthermore, can transmit the passage information signal also including the direction of the passage to the management body device 2.

The management body device 2 receiving the passage information signal through the communicating device 5 stores the passage information signal in the memory 9.

The contact/non-contact communication between the ID card 19 and the passage recognizing device 4 can also be executed even if the school or kindergarten children A, B and C carrying the IC card 19 simply pass through the passage recognizing device 4.

On the other hand, at the time of school attendance or leaving, the school bus 20 moves along a next operation schedule, for example. More specifically, the school bus 20 leaves the school or kindergarten 100 at 07:30 (15:15). Then, the school bus 20 moves along such an operation schedule that it arrives at the get-on/off point α at 07:45 (15:30), arrives at the get-on/off point β at 7:50 (15:35) and arrives at the get-on/off point γ at 07:55 (15:40), and thereafter returns to the school or kindergarten 100 at 8:10 (15:55).

During the operation, the school bus 20 stops temporarily in each of the get-on/off points α, β and γ. During the stop, the crew of the school bus 20 causes the school or kindergarten children A, B and C to get on/off at the get-on/off points α, β and γ as is registered. When the school or kindergarten children A, B and C completely get on/off, the school bus 20 stands by for a constant standby period of time and then moves over the operation route 21 toward the next get-on/off points α, β and γ.

At the time of get-on/off, the school or kindergarten children A, B and C use the carried ID card 19 to perform the contact/non-contact communication together with the management terminal device 3. More specifically, the contact/non-contact communication is executed between the ID card 19 and the communicating device body 13a of the contact/non-contact communicating device 13. The contact/non-contact communication between the ID card 19 and the communicating device body 13a can also be executed by the simple passage of the school or kindergarten children A, B and C carrying the ID card 19 through the communicating device body 13a.

When such a contact/non-contact communication is executed, the get-on/off detecting section 13b detects the get-on/off operations of the school or kindergarten children A, B and C. At the same time, the get-on/off person recognizing section 13c reads an ID number recorded on the ID card 19. Then, the get-on/off detecting section 13b outputs get-on/off detection information to the transportation information generating section 15. The get-on/off person recognizing section 13c outputs the ID number information of the ID card 19 thus detected to the transportation information generating section 15.

When the get-on/off detection information and the ID number information are input, the transportation information generating section 15 reads, from the position detector 12, the current position information of the school bus 20 at that time (since the position information indicates get-on/off position information, it will be hereinafter referred to as get-on/off position information). Furthermore, the transportation information generator 15 generates transportation information obtained by superposing the get-on/off position information, the get-on/off detection information, the ID number information and the get-on/off time information (read from the timer 15a) which are read. The transportation information generator 15 outputs the generated transportation information to the communicating device 16. In the communicating device 16, the input transformation information is transmitted to the management body device 2.

The operation of the management terminal device 3 has been described above. Next, the operation of the management body device 2 will be described. The operation of the management body device 2 will be described with reference to the flowcharts of FIGS. 7 and 8.

The communicating device 5 of the management body device 2 monitors whether or not the management terminal device 3 receives the transmitted transportation information (Step 701). Upon receipt of the transportation information, the communicating device 5 outputs the received transportation information to the collator 7. Upon receipt of the transportation information, the collator 7 reads the contents recorded in the database 6 and collates both of them (Step 702).

The collator 7 specifically executes the collating work in the following manner. More specifically, first of all, the collator 7 fetches the ID number from the transportation information. Then, the ID number thus fetched is collated with the pick-up registration table 11A, thereby specifying the school or kindergarten child A, B or C corresponding to the ID number. Next, the collator 7 fetches the get-on/off position information and the get-on/off time information from the transportation information. Thereafter, the collator 7 collates the get-on/off position information and the get-on/off time information thus fetched with the contents registered in the pick-up registration table 11A for the specified school or kindergarten child A, B or C. More specifically, the collator 7 collates the school attendance get-on point information and the school leaving get-off point information in the pick-up registration table 11A with the get-on/off position information in the transportation information. Furthermore, the collator 7 collates the school attendance get-on time information and the school leaving get-off time information in the pick-up registration table 11A with the get-on/off time information in the transportation information.

The collator 7 outputs the result of the collation to the deciding device 8. The deciding device 8 carries out the following decision based on the result of the collation which is input. More specifically, the deciding device 8 first decides whether or not a get-on/off position is set in accordance with registration in the result of the collation (Step 703). Next, the deciding device 8 decides whether or not the get-on/off time is set in accordance with the registration in the result of the collation (Step 704).

If it is decided that the get-on/off position and the get-on/off time are set in accordance with the registration at the Steps 703 and 704, the deciding device 8 decides that the school or kindergarten child A, B or C corresponding to the ID number normally gets on/off the school bus 20 and records the decision in the memory 9 (Step 705).

Furthermore, the deciding device 8 creates a normal get-on/off signal indicating that the school or kindergarten child A, B or C corresponding to the ID number normally gets on/off the school bus 20. Then, the deciding device 8 outputs the created normal get-on/off signal to the communicating device 5. The communicating device 5 transmits the input normal get-on/off signal to the management terminal device 3 (Step 706).

The communicating device 16 of the management terminal device 3 receiving the normal get-on/off signal outputs the same signal to the alarm 17. The alarm 17 decodes the normal get-on/off signal to carry out a display or vocal processing by means of a display unit or a vocal unit which is not shown, thereby giving a notice to the crew of the school bus 20.

More specifically, the alarm 17 executes a display operation or a vocal operation indicating that the school or kindergarten child A, B or C corresponding to the read ID number in the get-on/off person recognizing section 13c normally gets on/off the school bus 20. The crew recognizes the display or vocal state, thereby acknowledging that the get-on/off state of the school or kindergarten child A, B or C getting on/off is normal.

The transportation management system 1 can instantaneously carry out a processing such as the recognition of the ID card 19, the information communication, the decision of the get-on/off situation or the like. For this reason, the operation for displaying or vocally indicating the normal get-on/off situation is executed almost simultaneously with the presentation of the ID card 19.

On the other hand, if the deciding device 8 decides that the get-on/off position and the get-on/off time are not set in accordance with the registration at the Steps 703 and 704, the deciding device 8 decides that the school or kindergarten child A, B or C corresponding to the ID number gets on/off and does not normally get on/off the school bus 20, and records the decision in the memory 9 (Step 707).

For abnormal get-on/off, it can be supposed that the school or kindergarten child A, B or C gets on/off at a different get-on/off point from the registered get-on/off point or the school or kindergarten child A, B or C gets on/off at a different time from the registered get-on/off time.

In the case in which they get on/off at a different time, the following state can be specifically supposed. More specifically, there can be supposed the case in which the school bus 20 travels along the operation route 21 plural times and the school or kindergarten children A, B and C get on the school bus 20 at a different traveling time from the registered traveling time.

In such a case, the deciding device 8 executes to record abnormal get-on/off and then creates an abnormal get-on/off signal indicting that the school or kindergarten child A, B or C corresponding to the ID number does not normally get on/off the school bus 20. Thereafter, the created abnormal get-on/off signal is output to the communicating device 5. The communicating device 5 transmits the input abnormal get-on/off signal to the management terminal device 3 (Step 708).

The communicating device 16 of the management terminal device 3 receiving the abnormal get-on/off signal outputs the same signal to the alarm 17. The alarm 17 decodes the abnormal get-on/off signal and carries out a display or vocal processing by means of a display unit or a vocal unit which is not shown, thereby giving a notice to the crew of the school bus 20. The crew recognizes the display or vocal state, thereby acknowledging the get-on/off state of the school or kindergarten children A, B and C during get-on/off is abnormal.

More specifically, the alarm 17 executes a display operation or a vocal operation indicating that the school or kindergarten child A, B or C corresponding to the ID number read by the get-on/off person recognizing section 13c gets on/off the school bus 20 and the get-on/off time and the get-on/off position are not set in accordance with the registration. The transportation management system 1 can instantaneously carry out a processing such as the recognition of the ID card 19, the information communication, the decision of the get-on/off situation or the like. Consequently, the display or vocal operation for the abnormal get-on/off situation is executed almost simultaneously with the presentation of the ID card 19.

After sending the abnormal get-on/off signal to the management terminal device 3, the management body device 2 reads, from the contact address registration table 11C of the database 6, the contact address information of the communicating device carried by the guardians of the school or kindergarten children A, B and C abnormally getting on/off and the contact address information of the school or kindergarten 100. A voice (a composite voice or a recorded voice) or text data indicating that the school or kindergarten children A, B and C carry out the abnormal get-on/off is/are automatically sent to the contact address of the guardian thus read (a telephone, a cell phone or a personal computer) (Step 709). In that case, it is preferable that information specifically indicating the get-on/off state should be added to the voice or text data to be sent.

Consequently, the guardian acknowledges that the school or kindergarten children A, B and C get on/off on the different get-on/off points α, β and γ at different get-on/off times. Consequently, the guardians can rapidly and accurately confirm the news of the school or kindergarten children A, B and C. In the case in which the management body device 2 is set to the school or kindergarten 100, the manager of the school or kindergarten 100 can acknowledge the abnormal get-on/off of the school or kindergarten children A, B and C by monitoring the result of the decision of the deciding device 8. Moreover, in the case in which the management body device 2 is provided in the transfer organization of the pick-up management business, the management body device 2 also transmits information obtained by detecting the abnormal get-on/off. Consequently, the school or kindergarten 100 acknowledges the abnormal get-on/off of the school or kindergarten children A, B and C.

The processing described with reference to FIG. 7 serves to detect and report that the school or kindergarten children A, B and C get on/off on the different get-on/off points α, β and γ at different get-on/off times. Next, description will be given, with reference to the flowchart of FIG. 8, to the processing of detecting and reporting that the school or kindergarten children A, B and C having get-on/off times registered for the predetermined get-on/off points α, β and γ do not get on/off at all on the registered points at the registered times.

During the operation, the school bus 20 arriving at the get-on/off points α, β and γ stands by for a predetermined period of time until the school or kindergarten children A, B and C completely get on/off. The deciding device 8 of the management body device 2 reads get-on/off completion data recorded in the memory 9 and data of the pick-up registration table 11A recorded in the database 6 respectively for a standby period, and decides whether or not all the school or kindergarten children A, B and C having get-on/off registered completely get on/off at the get-on/off points α, β and γ (Step 801).

If it is decided that all the school or kindergarten children A, B and C completely get on/off at the Step 801, the deciding section 8 stores, in the memory 9, information indicating that all the school or kindergarten children A, B and C get on/off completely and normally at the get-on/off points α, β and γ (Step 802).

Furthermore, the deciding section 8 creates a normal get-on/off completion signal indicating that all the school or kindergarten children A, B and C having the get-on/off registered get on/off normally and completely at the get-on/off points α, β and γ. Then, the normal get-on/off completion signal thus created is output to the communicating device 5. The communicating device 5 transmits the input normal get-on/off completion signal to the management terminal device 3 (Step 803).

The communicating device 16 of the management terminal device 3 receiving the normal get-on/off completion signal outputs the same signal to the alarm 17. The alarm 17 decodes the normal get-on/off completion signal and performs a display or vocal processing by means of a display unit or a vocal unit which is not shown, thereby giving a notice to the crew of the school bus 20. The crew recognizes the display or vocal state, thereby acknowledging that the get-on/off state of all the school or kindergarten children A, B and C completing the get-on/off is normal.

The transportation management system 1 can instantaneously carry out a processing such as the recognition of the ID card 19, the information communication, the decision of a get-on/off situation or the like. For this reason, the operation for displaying or vocally indicating the normal get-on/off situation is carried out almost simultaneously when a predetermined standby time passes.

More specifically, the alarm 17 executes the display or vocal operation indicating that all the school or kindergarten children A, B and C having the get-on/off registered get on/off normally and completely at the get-on/off points α, β and γ.

On the other hand, at the Step 801, in the case in which the deciding device 8 decides that all the school or kindergarten children A, B and C having the get-on/off registered do not completely get on/off at the get-on/off points α, β and γ even if the predetermined standby time passes, the deciding device 8 first specifies the school or kindergarten child A, B or C who does not completely get on/off (Step 804).

Furthermore, the deciding device 8 refers to a passage information signal sent from the passage recognizing device 4 provided on the school zone routes of the school or kindergarten children A, B and C thus specified. The passage information signal sent from the passage recognizing device 4 is received by the communicating device 5 and is then recorded in the memory 9 in advance. The passage information signal indicates that the passage of the school or kindergarten children A, B and C through the school zone route is detected by the passage recognizing device 4. Therefore, the deciding device 8 can detect whether or not the school or kindergarten child A, B or C specified at the Step 804 passes his (her) school zone route by referring to the passage information signal. By referring to the passage information signal, the deciding section 8 detects whether or not the specified school or kindergarten child A, B or C passes his (her) school zone route (Step 805).

When normally getting on the school bus 20 at the time of school attendance, the school or kindergarten child A, B or C must have already passed his (her) school zone route. For this reason, the operation of the Step 805 to be executed in school bus get-on at the time of school attendance (the read and verification of the passage information signal) can be executed in the same time zone as the school bus get-on time.

On the other hand, when normally getting off the school bus 20, the school or kindergarten child A, B or C must not have completely passed his (her) school zone route. For this reason, the operation of the Step 805 to be executed in school bus get-off at the time of school leaving (the read and verification of the passage information signal) is to be executed at a little later time in place of the same time zone as the school bus get-off time.

In the case in which the passage on the school zone route is detected at the Step 805, the deciding device 8 decides that the specified school or kindergarten child A, B or C is set in the following state. More specifically, in this case, the deciding device 8 decides that he (she) does not get on/off the school bus 20 according to a schedule but normally passes through the school zone route. The deciding device 8 carrying out the decision creates abnormal get-on/off information comprising the result of the decision and records the same information in the memory 9 (Step 806).

Furthermore, the deciding device 8 creates the abnormal get-on/off signal indicating that the school or kindergarten child A, B or C corresponding to the ID number does not get on/off the school bus 20 but passes through the school zone route. Then, the abnormal get-on/off signal thus created is output to the communicating device 5. The communicating device 5 transmits the input abnormal get-on/off signal to the management terminal device 3 (Step 807).

The communicating device 16 of the management terminal device 3 receiving such an abnormal get-on/off signal outputs the same signal to the alarm 17. The alarm 17 decodes the abnormal get-on/off signal and displays the same signal on a display unit which is not shown, thereby giving a notice to the crew of the school bus 20. The crew recognizes the display or vocal state, thereby acknowledging that the school or kindergarten child A, B or C to get on and off is brought into the get-on/off state in the abnormal condition described above.

More specifically, the alarm 17 executes the display or vocal operation indicating that the school or kindergarten child A, B or C to get on/off does not get-on/off the school bus 20 according to the schedule but passes through his (her) school zone route.

After sending the abnormal get-on/off signal to the management terminal device 3, the controller 10 of the management body device 2 reads the contact address information of the guardian of the school or kindergarten child A, B or C who does not get on/off from the contact address registration table 11C of the database 6. Then, the controller 10 automatically sends a voice (a composite voice or a recorded voice) or text data indicating that the school or kindergarten child A, B or C does not normally get on/off in the above-mentioned state through the communicating device 5 to the contact address of the guardian thus read (a telephone, a cell phone or a personal computer) (Step 808).

Consequently, the guardian recognizes that the school or kindergarten child A, B or C passes through the school zone route but does not get on/off the school bus 20 at a scheduled get on/off time. Consequently, the guardian can confirm the news of the school or kindergarten child A, B or C rapidly and accurately.

In the case in which the management body device 2 is located in the school or kindergarten 100, the manager of the school or kindergarten 100 can acknowledge the abnormal get-on/off of the school or kindergarten child A, B or C by monitoring the result of the decision of the deciding device 8. Moreover, in the case in which the management body device 2 is provided in an organization engaged in the pick-up management business on consignment contract, the management body device 2 also transmits information about the detection of the abnormal get-on/off to the school or kindergarten 100. Consequently, the school or kindergarten 100 recognizes the abnormal get-on/off of the school or kindergarten child A, B or C.

On the other hand, in the case in which the passage of the passage recognizing device 4 by the specified school or kindergarten child A, B or C cannot be detected at the Step 805, the deciding device 8 decides that the school or kindergarten child A, B or C is set in the following state. More specifically, in this case, the deciding device 8 decides that he (she) neither gets on/off the school bus 20 according to a schedule nor passes through the school zone route. The deciding device 8 carrying out such a decision creates abnormal get-on/off information comprising the result of the decision and records the same result in the memory 9 (Step 809).

Furthermore, the deciding device 8 creates an abnormal get-on/of signal indicating that the school or kindergarten child A, B or C corresponding to the ID number neither gets on/off the school bus 20 in accordance with the schedule nor passes through the school zone route. The deciding device 8 outputs the created abnormal get-on/off signal to the communicating device 5. The communicating device 5 transmits the input abnormal get-on/off signal to the management terminal device 3 (Step 810).

The communicating device 16 of the management terminal device 3 receiving such an abnormal get-on/off signal outputs the same signal to the alarm 17. The alarm 17 decodes the abnormal get-on/off signal and carries out a display or vocal processing by means of a display unit or a vocal unit which is not shown, thereby giving a notice to the crew of the school bus 20. The crew recognizes the display or vocal state, thereby acknowledging that the school or kindergarten child A, B or C to get on/off is set into the get-on/off state in the abnormal condition described above.

More specifically, the alarm 17 executes a display or vocal operation indicating that the school or kindergarten child A, B or C to get on/off neither gets on/off the school bus 20 according to the schedule nor passes through his (her) school zone route.

After sending the abnormal get-on/off signal to the management terminal device 3, the controller 10 of the management body device 2 reads, from the contact address registration table 11C of the database 6, the contact address information of the communicating device carried by the guardian of the school or kindergarten child A, B or C who does not get on/off. The controller 10 automatically sends a voice (a composite voice or a recorded voice) or text data indicating that the school or kindergarten child A, B or C does not normally get on/off in the above-mentioned condition through the communicating device 5 to the contact address of the guardian thus read (a telephone, a cell phone or a personal computer) (Step 811).

Consequently, the guardian acknowledges that the school or kindergarten child A, B or C neither gets on/off the school bus 20 at a scheduled get-on/off time nor passes through the school zone route. Consequently, the guardian can confirm the news of the school or kindergarten child A, B or C rapidly and accurately.

In the case in which the management body device 2 is located in the school or kindergarten 100, the manager of the school or kindergarten 100 can acknowledge the abnormal get-on/off of the school or kindergarten child A, B or C by monitoring the result of the decision of the deciding device 8. In the case in which the management body device 2 is provided in an organization engaged in the pick-up management business on consignment contract, the management body device 2 also transmits information about the detection of the abnormal get-on/off to the school or kindergarten 100. Consequently, the school or kindergarten 100 acknowledges the abnormal get-on/off of the school or kindergarten child A, B or C.

Further, when the passage recognizing device 4 is replaced with a device capable of recognizing the direction of the passage of the school or kindergarten child A, B or C, the safety of the school or kindergarten child A, B or C will be more easily confirmed so that precision can be increased.

In the embodiment described above, furthermore, the abnormal get-on/off signal is transmitted at the Step 803 and the school or kindergarten child A, B or C normally getting on/off is completely monitored. However, the monitoring may be carried out continuously until the school or kindergarten child A, B or C normally getting on/off normally passes through the passage recognizing device 4 provided on his (her) school zone route. Consequently, the precision in school attendance monitoring can further be enhanced.

In the embodiment described above, the present invention has been carried out in the school bus system operated for the school attendance of the school or kindergarten child A, B or C in the school or kindergarten 100. However, the present invention is not restricted to such a system. For example, the present invention can be carried out also in a cyclic commuting bus system for transporting a commuter from a fixed point on a predetermined route (the closest station to a company) to another fixed point (the company) by a commuting bus operated periodically along the route.

In the embodiment described above, the following new structure can also be added. More specifically, the transportation state information (a transportation history or the like) of a transportation object (a school or kindergarten child or a commuter) stored in the memory 9 is certified to be reliable and can be output and presented according to a request sent from an external communication terminal device, for example, the communication terminal device of an insurance company or the like. In this case, the following embodiment can be supposed specifically.

It is assumed that an accident is caused in a transportation vehicle or the like at the time of school attendance or commutation. In such a case, a transportation object (a school or kindergarten child, a commuter or a guardian thereof) claims an insurance to the insurance company. In this case, the insurance company requires the following evidence to pay the insurance money. More specifically, it is necessary for an official certification authority to prove that the accident really occurred in the transportation vehicle at that time and an insurance claimer (transportation object) was aboard the same vehicle.

The management body device 2 can function as the official certification authority for issuing such a certification. In this case, a transportation state output device according to claims is constituted by the memory 9, the communicating device 5 and the controller 10.

In the transportation management system described above, the guardian of the transportation object (the school or kindergarten child or the commuter) can grasp the transportation situation of the transportation object in real time and can rapidly cope with an unexpected situation such as an accident which is taken during the transportation. For this reason, an organization for operating the transportation management system according to the present invention which can provide such a service can impose accounting on the guardian.

For an accounting method, there can be proposed a method of periodically collecting a constant service offering fee by automatic bank transfer or the like, and a method of collecting a charge by the automatic bank transfer or the like according to the number of transmissions of abnormal get-on/off information.

As described above, the transportation management system 1 enables constituting a system capable of deciding the transportation situation of a transportation object during transportation with high precision and rapidly reporting the decision.

While the most desirable embodiment of the present invention has been described above in detail, the combination and alignment of components according to the preferred embodiment can be changed in various forms without departing from the spirit and scope of the invention which will be claimed below.

What is claimed is:

1. A transportation management system for managing a transportation state of a transportation object by a transportation system for transporting the transportation object from a fixed point to another fixed point along a predetermined route by means of a transportation medium to be periodically operated along the route, comprising:
   a management terminal device provided in the transportation medium; and
   a management body device for remotely managing the transportation state of the transportation object,
   the management terminal device having:
      a position detecting device for detecting a current position of the transportation medium;
      a get-on/off detecting device for detecting delivery in/out of the transportation object to/from the transportation medium; and
      a transportation information transmitter for transmitting transportation information including current position information of the transportation medium and delivery-in/out information of the transportation object to the management body device,
   the management body device having:
      a transportation information receiver for receiving transportation information transmitted from the management terminal device;
      a distance storage for storing predetermined transportation distance information for each transportation object;
      a collator for collating the received transportation information with the transportation distance information; and
      a deciding device for deciding the transportation state of the transportation object based on a result of the collation by the collator.

2. The transportation management system according to claim 1, wherein the management terminal device further has a recognizing device for individually recognizing the transportation object, and
   the get-on/off detecting device serves to individually recognize the transportation object and to detect delivery-in/out.

3. The transportation management system according to claim 1, wherein the management body device further has a first decision result transmitter for transmitting, to the management terminal device, decision result information obtained by the deciding device, and
   the management terminal device further has:
      a decision result receiver for receiving the decision result information; and
      an alarm for reporting the decision result information thus received.

4. The transportation management system according to claim 3, wherein the management body device further has:
   a contact address information storage for storing contact address information of a communicating device carried by a transportation manager of the transportation object; and
   a second decision result transmitter for reading, from the contact address information storage, the contact address information of the communicating device carried by the transportation manager of the transportation object having the decision result obtained from the deciding device and for transmitting the decision result information to the communicating device based on the contact address information thus read.

5. The transportation management system according to claim 4, wherein the second transportation result transmitter serves to transmit decision result information to the transportation manager when the deciding device gives a decision result of defective transportation.

6. The transportation management system according to claim 1, wherein the transportation object is a person,
the system further having a passage recognizing device provided on a passageway connecting a residence of the transportation object and a fixed point on the route and serving to recognize presence of passage of the transportation object and to transmit recognition result information to the management body device,
the management body device further having a recognition result information receiver for receiving the recognition result information, and
the deciding device decides a transportation state of the transportation object based on the recognition result information thus received and a collation result of the collator.

7. The transportation management system according to claim 6, wherein the passage recognizing device decides a direction of movement when the transportation object passes through the passage recognizing device.

8. The transportation management system according to claim 1, wherein the management body device further has a transportation state output device for outputting transportation state information of the transportation object according to a request sent from an external communication terminal device.

* * * * *